United States Patent
Kitada et al.

(10) Patent No.: US 9,100,530 B2
(45) Date of Patent: Aug. 4, 2015

(54) IMAGE PROCESSING APPARATUS, IMAGE PROCESSING METHOD AND STORAGE MEDIUM

(75) Inventors: Kazuya Kitada, Kawasaki (JP); Eisaku Tatsumi, Kawasaki (JP); Makiko Mori, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 789 days.

(21) Appl. No.: 12/904,372

(22) Filed: Oct. 14, 2010

(65) Prior Publication Data

US 2011/0102479 A1 May 5, 2011

(30) Foreign Application Priority Data

Oct. 29, 2009 (JP) ................. 2009-249478

(51) Int. Cl.
*G09G 3/36* (2006.01)
*H04N 7/01* (2006.01)
*G09G 3/20* (2006.01)

(52) U.S. Cl.
CPC ........... *H04N 7/0132* (2013.01); *G09G 3/2022* (2013.01)

(58) Field of Classification Search
CPC .... G09G 3/3607; G09G 3/3614; G09G 3/364
USPC .................................. 345/87–104
See application file for complete search history.

(56) References Cited

U.S. PATENT DOCUMENTS 6,788,342 B1 * 9/2004 Sugiura et al. ............... 348/234
6,924,843 B1 8/2005 Yamazaki et al.
7,057,667 B1 6/2006 Mori et al.
7,148,929 B1 12/2006 Mori et al.
7,162,101 B2 * 1/2007 Itokawa et al. ............... 382/282

(Continued)

FOREIGN PATENT DOCUMENTS

CN 1798247 A 7/2006
CN 101572050 A 11/2009

(Continued)

OTHER PUBLICATIONS

Nov. 28, 2012 Chinese Official Action in Chinese Patent Appln. No. 201010529325.0.

(Continued)

*Primary Examiner* — Alexander Eisen
*Assistant Examiner* — Nelson Lam
(74) *Attorney, Agent, or Firm* — Fitzpatrick, Cella, Harper & Scinto

(57) ABSTRACT

An image processing apparatus includes an identifier identifying, for each pixel in the frame image, minimum pixel values for each color component from pixel values of surrounding pixels for each color component. The surrounding pixels are positioned around the pixel. The identifier also identifies, as a common pixel value, a minimum value in the minimum pixel values identified for each color component. The apparatus further includes a generator generating a preprocessed image which can be obtained by replacing a pixel value of each pixel in the frame image with the common pixel value identified for the pixel by the identifier, a low pass filter generating a first subframe image by applying a low-pass filter to the preprocessed image, and a subtractor generating, as a second subframe image, a difference image between the frame image and the first subframe image.

11 Claims, 11 Drawing Sheets

(56) References Cited

U.S. PATENT DOCUMENTS

| | | | |
|---|---|---|---|
| 7,242,377 | B2 | 7/2007 | Mori |
| 7,474,168 | B2 | 1/2009 | Tatsumi |
| 7,508,452 | B2 | 3/2009 | Mori et al. |
| 7,542,619 | B2 | 6/2009 | Toyooka et al. |
| 7,679,626 | B2 | 3/2010 | Mori |
| 8,233,013 | B2 * | 7/2012 | Morisue et al. ............... 345/690 |
| 8,588,473 | B2 * | 11/2013 | Aida et al. .................... 382/107 |
| 8,619,189 | B2 * | 12/2013 | Ito et al. ........................ 348/441 |
| 2006/0119617 | A1 * | 6/2006 | Toyooka et al. ............... 345/619 |
| 2007/0133871 | A1 * | 6/2007 | Yoshiura ....................... 382/167 |
| 2008/0297460 | A1 * | 12/2008 | Peng et al. .................... 345/102 |
| 2009/0002400 | A1 * | 1/2009 | Ha et al. ........................ 345/690 |
| 2009/0184915 | A1 * | 7/2009 | Tsai et al. ..................... 345/102 |
| 2009/0273611 | A1 * | 11/2009 | Itokawa et al. ............... 345/619 |
| 2010/0127964 | A1 * | 5/2010 | Inada et al. ................... 345/102 |
| 2011/0292068 | A1 * | 12/2011 | Kobayashi .................... 345/589 |

FOREIGN PATENT DOCUMENTS

| | | | |
|---|---|---|---|
| EP | 2 023 315 | A2 | 2/2009 |
| EP | 2 114 067 | A2 | 11/2009 |
| JP | 2006-184896 | A | 7/2006 |

OTHER PUBLICATIONS

Sep. 23, 2011 European Search Report in European Patent Appln. No. 10188983.0.

Han-Feng Chen, et al., "P-44: Smooth Frame Insertion Method for Motion Blur Reduction in LCDs", EuroDisplay 2005, Jan. 1, 2005, pp. 359-361.

Hanfeng Chen, et al., "33.4: Smooth Frame Method for Reducing Motion Blur on OLED Panel", SID 08 Digest, 2008 SID International Symposium, Society for Information Display, Los Angeles, USA, vol. XXXIX, May 18, 2008, pp. 472-475.

F.H. van Heesch, et al., "Spatio Temporal Frequency Analysis of Motion Blur Reduction on LCDs", Image Processing, ICIP 2007, IEEE International Conference on IEEE, PI Sep. 1, 2007, pp. IV-401-IV-404.

Sep. 29, 2013 Chinese Official Action in Chinese Patent Appln. No. 201010529325.0.

* cited by examiner

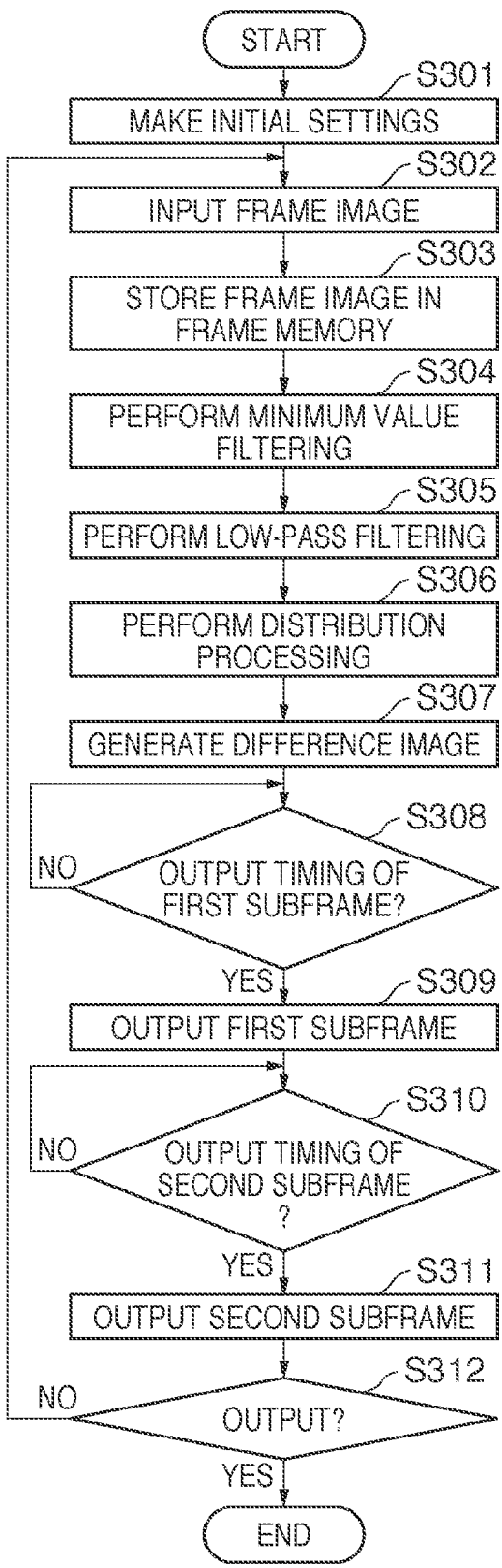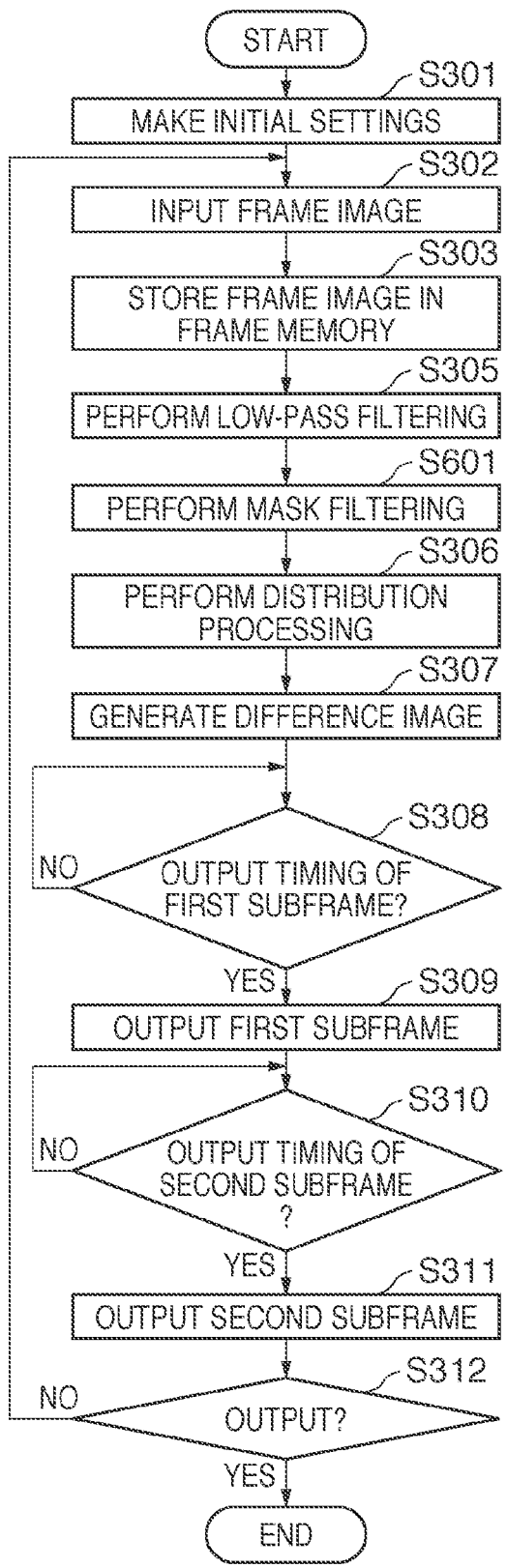

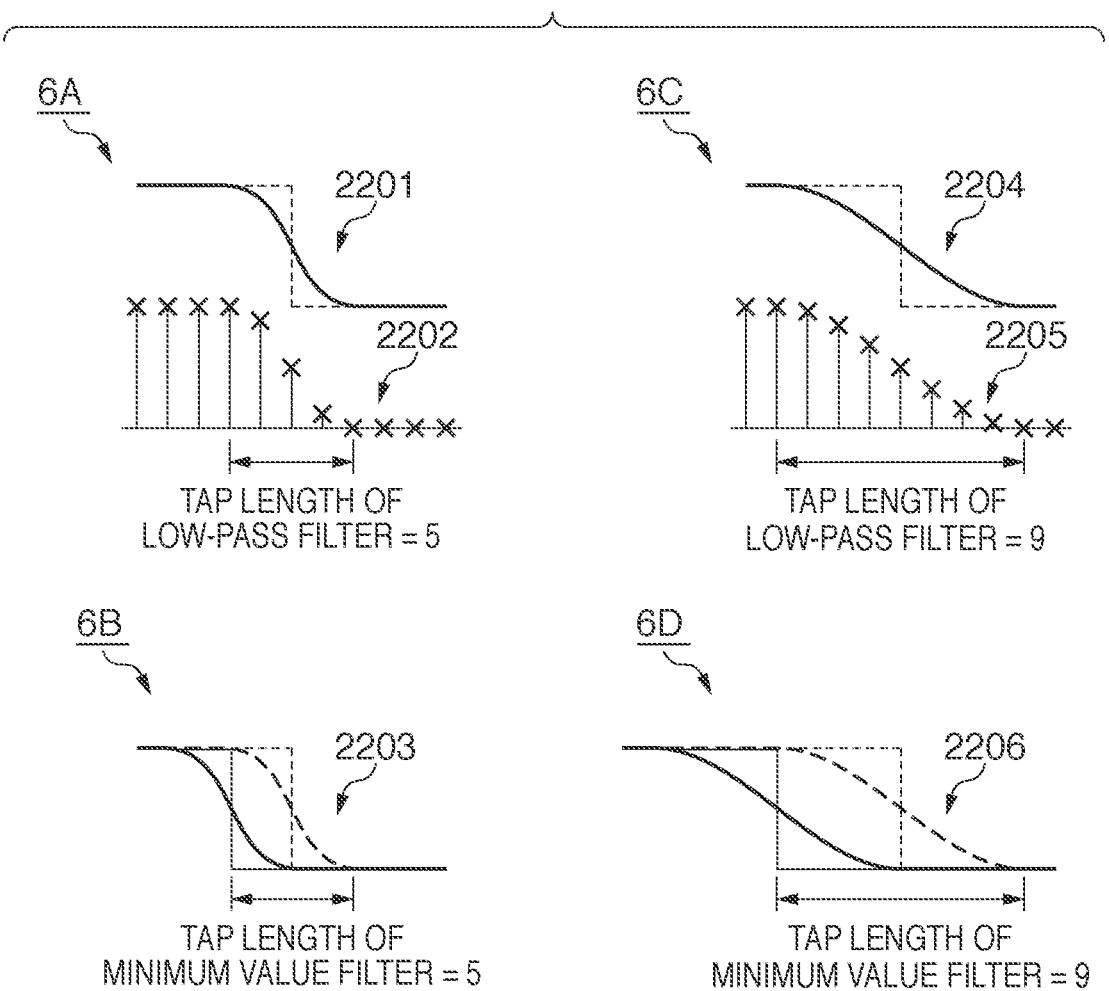

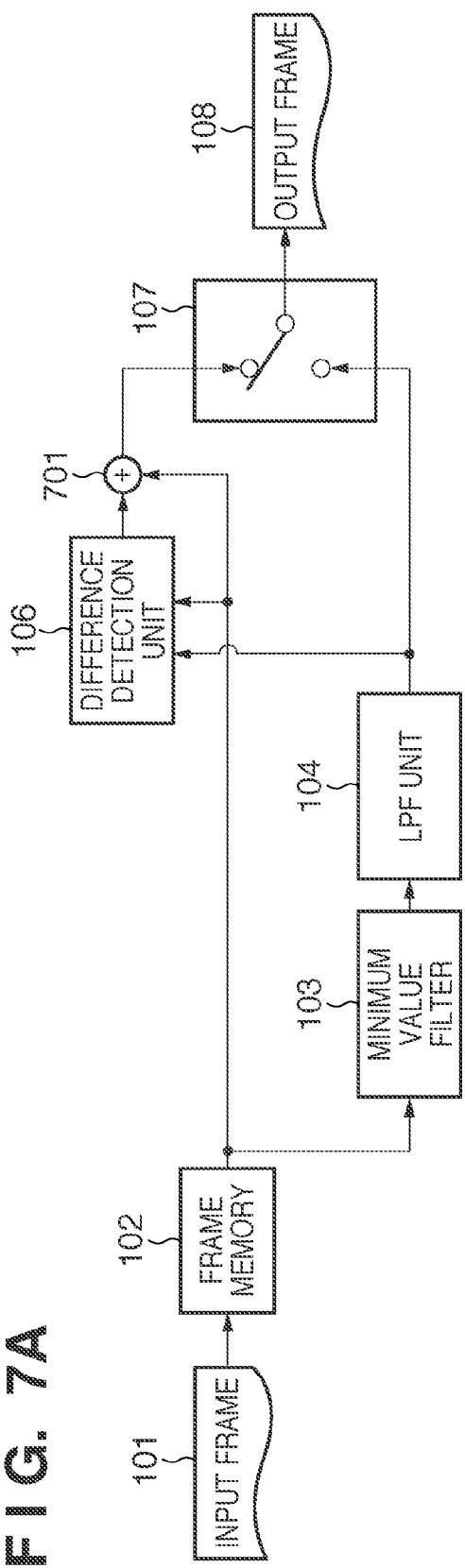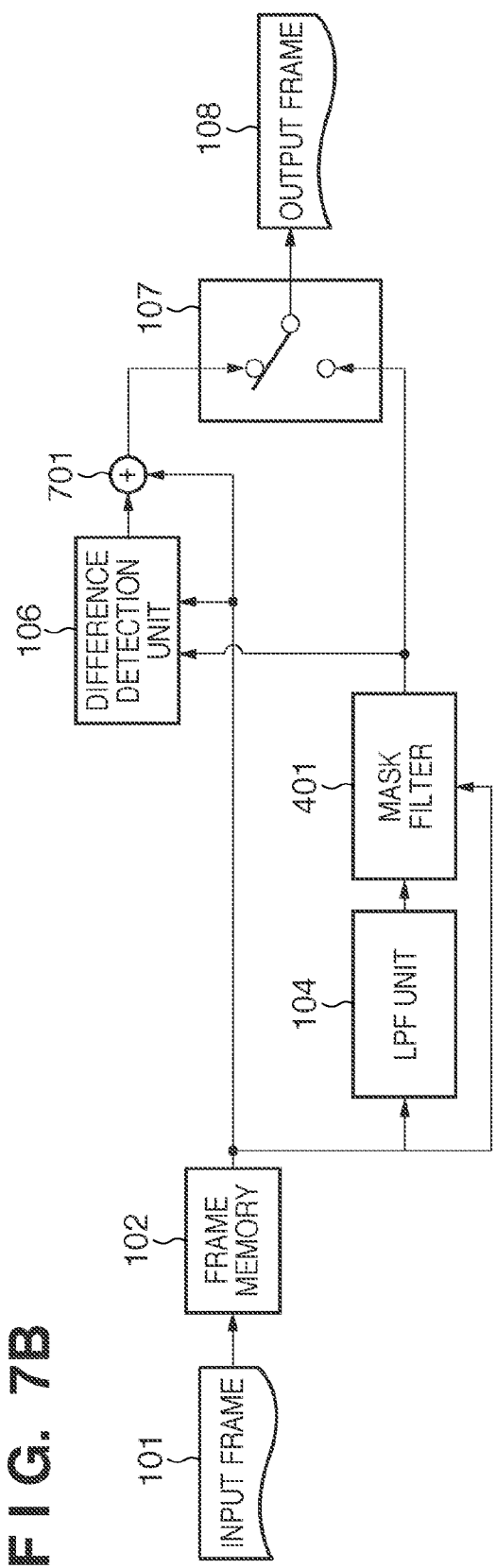

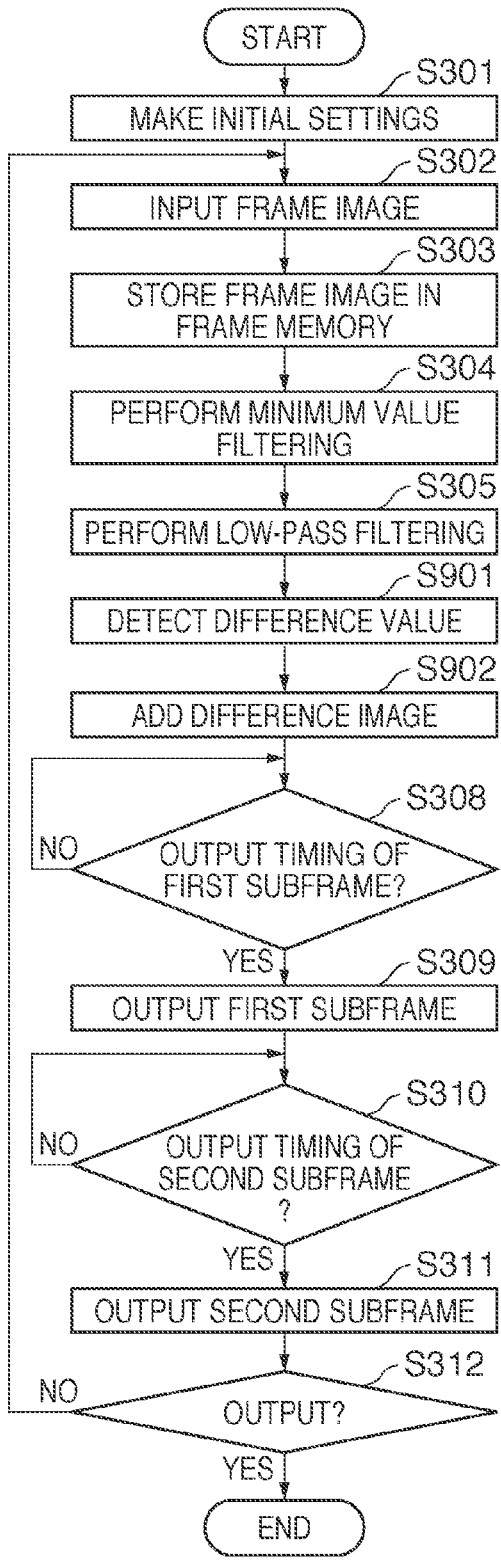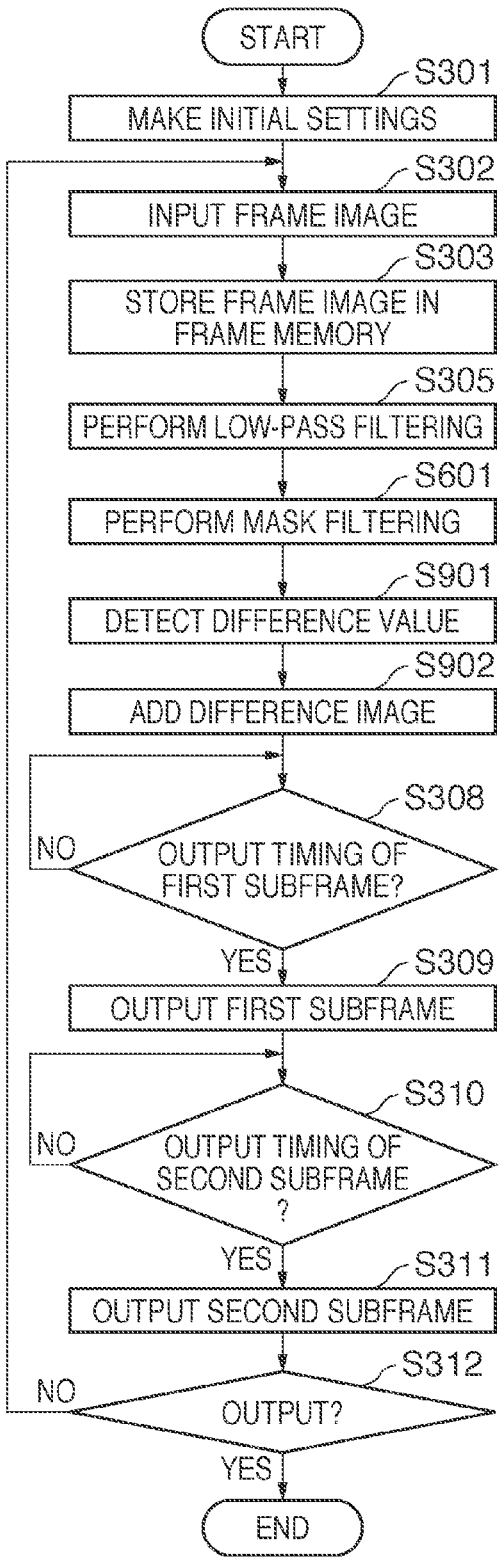

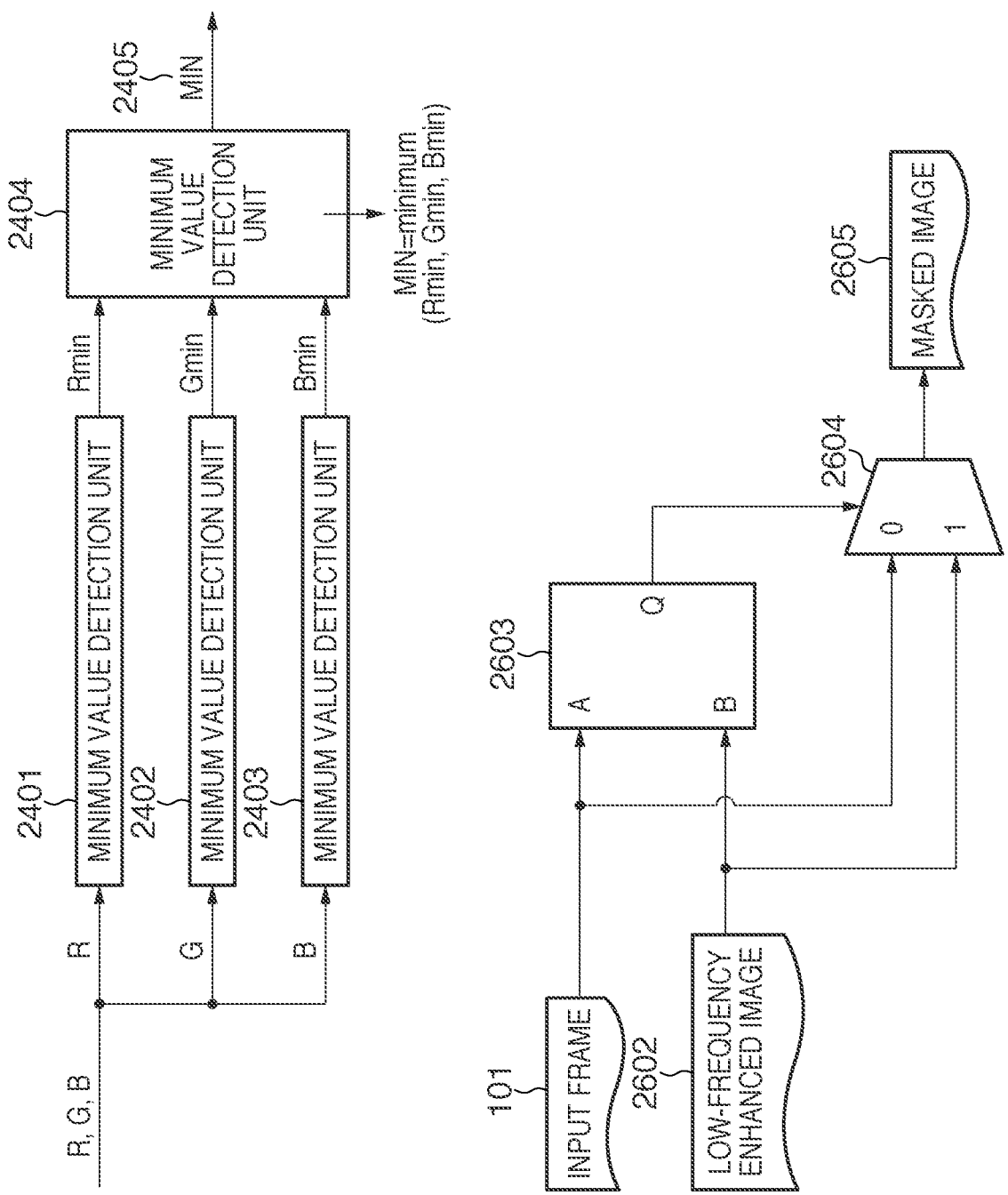

F I G. 12
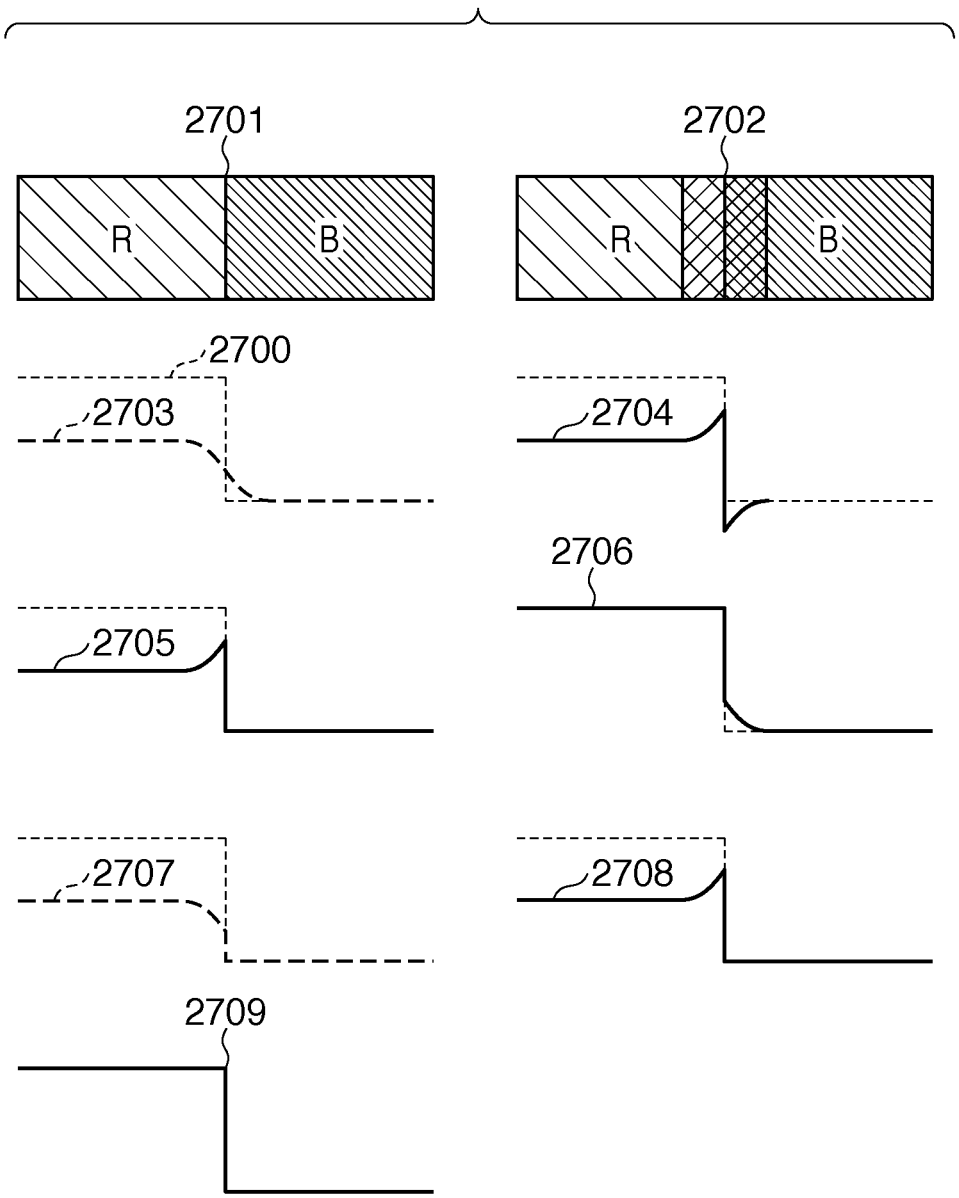

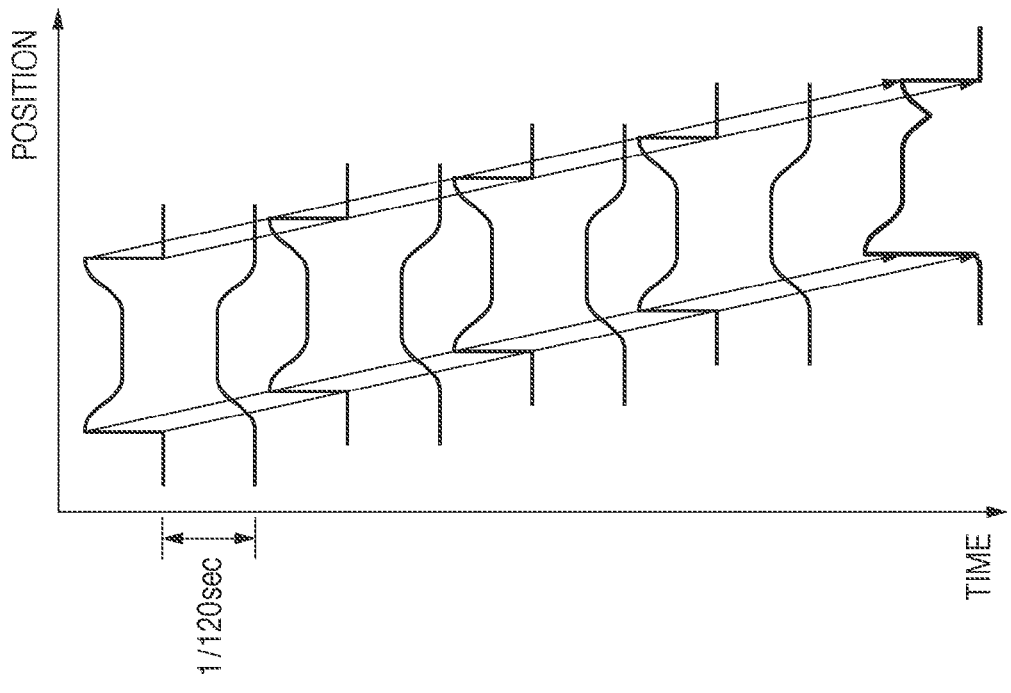
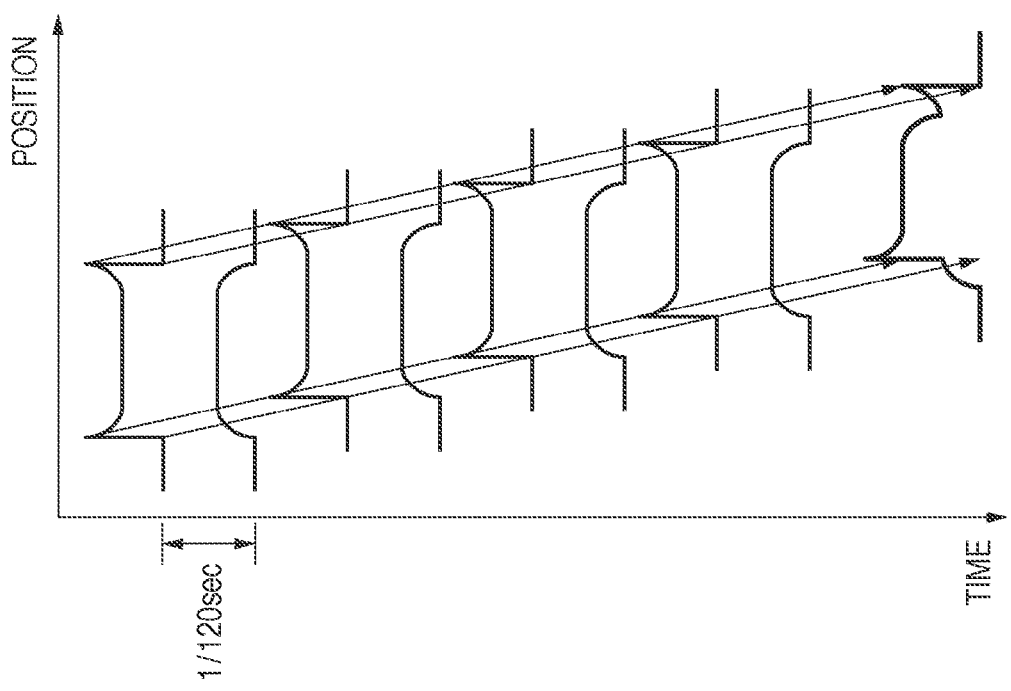

IMAGE PROCESSING APPARATUS, IMAGE PROCESSING METHOD AND STORAGE MEDIUM

BACKGROUND OF THE INVENTION

1. Field of the Invention

The present invention relates to an image processing technique of converting the frame rate of a moving image.

2. Description of the Related Art

CRTs have long been used as moving image display devices typified by a television receiver. However, panels using liquid crystal devices are becoming mainstream recently. When the liquid crystal device displays a moving image whose frame rate is 60 Hz, each pixel maintains emission for 1/60 sec. The liquid crystal device is therefore called a "hold type" device.

Further, field-emission-type display devices having the same emission characteristics as those of CRTs are currently under development. When a display device of this type displays a moving image whose frame rate is 60 Hz, light is emitted only instantaneously in 1/60 sec. Hence, the display device of this type is called an "impulse type" device.

The hold-type device easily generates a motion blur. The impulse-type device suffers a prominent flicker. Japanese Patent Laid-Open No. 2006-184896 discloses a technique to reduce a motion blur upon display on the hold-type device by raising the frame rate of a moving image. More specifically, two types of subframe images, that is, a subframe image containing only low-frequency components and one in which high-frequency components are enhanced are generated from one input frame image of a moving image whose frame rate is 60 Hz. These subframe images are alternately output as an output frame image in one cycle in 120 Hz. The original frame image is reproduced in one cycle in 60 Hz by alternately displaying the subframe image containing only low-frequency components and one in which high-frequency components are enhanced. The motion blur is reduced in a moving image whose frame rate is increased by this method, compared to an original moving image whose frame rate is 60 Hz.

However, when the method disclosed in Japanese Patent Laid-Open No. 2006-184896 is used, an image obtained by compositing the two types of frame images (that is, an image the viewer views) may become different from the original frame image. That is, the output image does not look the same as the original one. The viewer may perceive this as degradation.

The method disclosed in Japanese Patent Laid-Open No. 2006-184896 will be explained with reference to FIG. 4. A waveform 1901 exemplifies the waveform of an input frame image. A waveform 1902 is obtained by enhancing the low-frequency components of the waveform 1901 of the input frame image. A waveform 1903 represents high-frequency components obtained as the difference between the waveform 1901 (input frame image) and the waveform 1902 (low-frequency components). In the method disclosed in Japanese Patent Laid-Open No. 2006-184896, the high-frequency component waveform 1903 is added to the waveform 1901, generating a waveform 1904. In one cycle in 120 Hz, the waveforms 1902 and 1903 are alternately displayed. Theoretically, an apparent waveform becomes identical to the waveform 1901 by alternately displaying the waveforms 1902 and 1903 in one cycle in 120 Hz.

However, when the waveform 1901 has a value of 0 or almost 0, the waveform 1904 sometimes takes a negative value. Since an image having a negative value cannot be displayed, the negative value is displayed as "0" in practice, like a waveform 1905. In this case, the waveforms 1902 and 1905 are alternately displayed, so the apparent waveform becomes a waveform 1906. When a white character is displayed on a black background, the viewer perceives a blurred outline of the character.

SUMMARY OF THE INVENTION

The present invention provides a method of raising the frame rate of a moving image while suppressing degradation of an image.

According to one aspect of the invention, there is provided an image processing apparatus which generates a plurality of subframe images from a frame image comprising pixels each of which has pixel values for each color component, and outputs the plurality of subframe images. The apparatus comprises: an identification unit configured to identify, for each pixel in the frame image, minimum pixel values for each color component from pixel values of surrounding pixels for each color component, wherein the surrounding pixels are positioned around the pixel, and identifying, as a common pixel value, a minimum value in the minimum pixel values identified for each color component; a generation unit configured to generate a preprocessed image which can be obtained by replacing a pixel value of each pixel in the frame image with the common pixel value identified for the pixel by the identification unit; a low-pass filtering unit configured to generate a first subframe image by applying a low-pass filter to the preprocessed image; a subtraction unit configured to generate, as a second subframe image, a difference image between the frame image and the first subframe image; and an output unit configured to output the first subframe image and the second subframe image.

Further features of the present invention will become apparent from the following description of exemplary embodiments (with reference to the attached drawings).

BRIEF DESCRIPTION OF THE DRAWINGS

FIGS. 3A and 3B are flowcharts showing processing sequences according to the first and second embodiments, respectively;

FIG. 6 is a graph for explaining the relationship in the number of taps between filters according to modification 2;

FIGS. 7A and 7B are block diagrams each exemplifying an image processing apparatus according to modification 1;

FIGS. 9A and 9B are flowcharts each showing a processing sequence according to modification 1;

FIG. 10 is a block diagram showing the circuit arrangement of the minimum value filter according to the first embodiment;

FIG. 11 is a block diagram showing the circuit arrangement of a mask filter according to the second embodiment;

FIG. 12 is a view for explaining processing according to the second embodiment; and FIGS. 13A and 13B are graphs for explaining the characteristics of processing according to the second embodiment.

DESCRIPTION OF THE EMBODIMENTS

First Embodiment

Figure 1A:
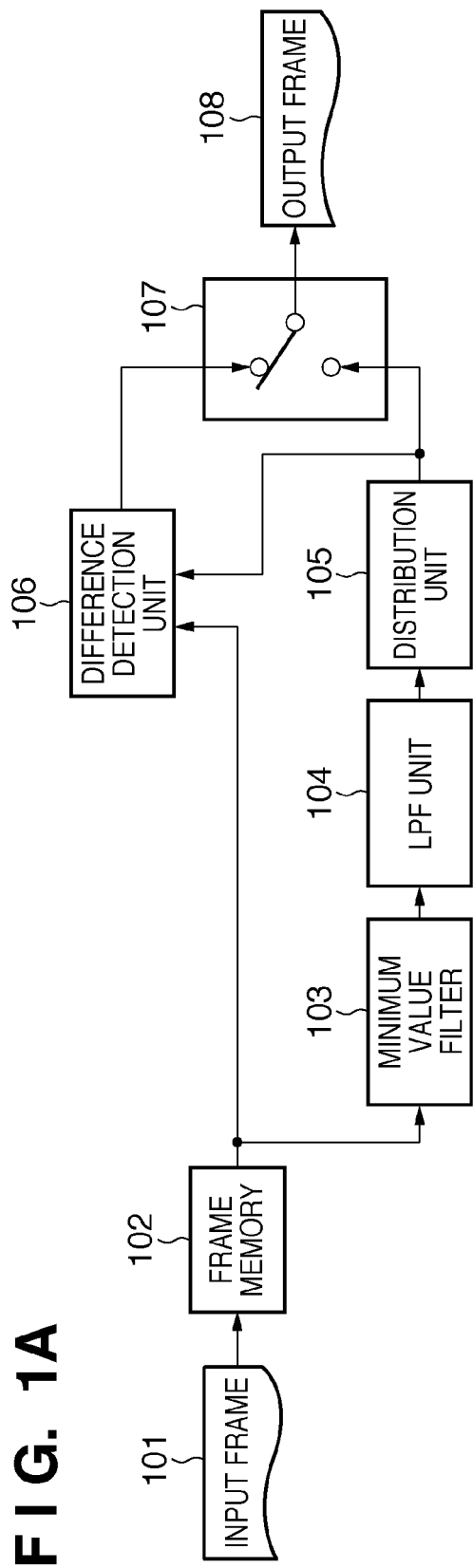
FIGS. 1A and 1B are block diagrams exemplifying image processing apparatuses according to the first and second embodiments, respectively.
Figure 2A:
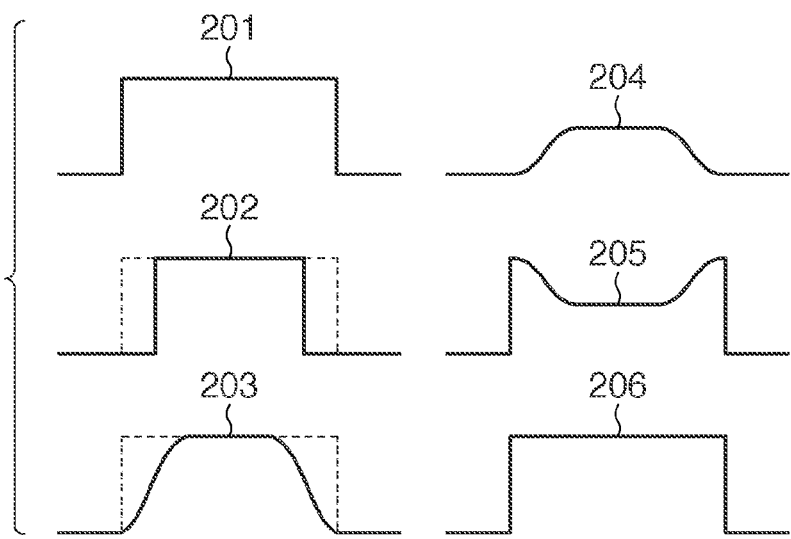
FIGS. 2A, 2B, and 2C are waveform charts for explaining processes according to the first and second embodiments, and modification 2, respectively.

The first embodiment of the present invention will be described with reference to FIGS. 1A and 2A. FIG. 1A is a block diagram showing an arrangement in the first embodiment. FIG. 2A exemplifies processing waveforms in the first embodiment. The first embodiment will explain an example of applying the present invention to an impulse-type display device, such as a field-emission-type display device. In the following description, each pixel of a frame image has the pixel values of three color components (R, G, and B). However, each pixel may have the pixel value of a color component other than R, G, and B. Also, each pixel may have the pixel values of two, or four or more color components.

A frame memory 102 temporarily stores an input frame image 101 serving as an input image. The image stored in the frame memory 102 is read out twice and sent to a minimum value filter 103 and difference detection unit 106. In the following description, a plurality of subframe images are generated from one input frame image.

Figure 8:
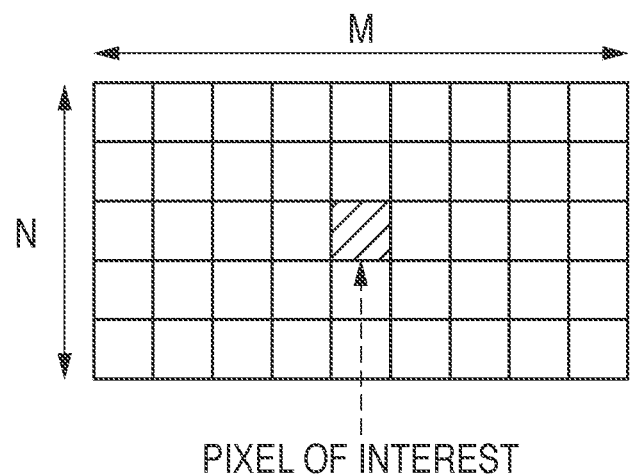
FIG. 8 is a conceptual view of a minimum value filter according to the first embodiment.

The minimum value filter 103 generates a preprocessed image from the readout input frame image. More specifically, for each pixel in the input frame image, the minimum value filter 103 identifies minimum pixel values for each color component from pixel values of each color component in surrounding pixels around the pixel of interest. Then, the minimum value filter 103 identifies, as a common pixel value, a minimum value in the minimum pixel values for each color component. The minimum value filter 103 sets the common pixel value as a pixel value common to each color component of a pixel in the preprocessed image which corresponds to the position of the pixel of interest. FIG. 8 is a conceptual view of the minimum value filter 103. FIG. 10 shows a practical circuit arrangement of the minimum value filter.

As shown in FIG. 8, the minimum value filter 103 refers to image data (M×N) pixels around the pixel of interest. Minimum value detection units 2401 to 2403 obtain the minimum values (minimum pixel values) of R, G, and B pixel values, respectively. More specifically, the minimum value detection unit 2401 selects a minimum R pixel value in the R pixel values of (M×N) pixels. Similarly, the minimum value detection unit 2402 selects a minimum G pixel value in the G pixel values of the (M×N) pixels. The minimum value detection unit 2403 selects a minimum B pixel value in the B pixel values of the (M×N) pixels. A minimum value detection unit 2404 identifies the smallest pixel value (common pixel value) in the three pixel values respectively selected by the minimum value detection units 2401 to 2403 (identification unit). The pixel value selected by the minimum value detection unit 2404 is defined as MIN. The minimum value filter 103 sets (R, G, B)=(MIN, MIN, MIN) as the value of a pixel in the preprocessed image which corresponds to the position of the pixel of interest. By executing this processing for each pixel, the minimum value filter 103 generates a preprocessed image from the input frame image (generation unit). The minimum-value selection processing and replacement processing need not be performed in two steps and may be done in one step.

A low-pass filtering unit 104 generates a low-frequency enhanced image by applying a low-pass filter to the preprocessed image (low-pass filtering unit). The low-pass filter is arbitrary and may be, for example, a Gaussian function, moving average filter, or weighted moving average filter. The low-pass filter can be a two-dimensional low-pass filter.

A distribution unit 105 determines the ratio at which low-frequency components are allotted to the first and second subframe images. To make the flicker less conspicuous, the brightness difference between the two subframe images is desirably small. In the first embodiment, the distribution unit 105 generates the first subframe image that is obtained by multiplying, by ½, each pixel value of a low-frequency enhanced image generated by the low-pass filtering unit 104. As a result, low-frequency components are equally allotted to the first and second subframe images, reducing the brightness difference between the subframe images. The distribution unit 105 outputs the first subframe image to a switching circuit 107. The distribution unit 105 also outputs the first subframe image to the difference detection unit 106. However, the brightness difference can be set arbitrarily. For example, a special-display effect can be obtained by intentionally widening the luminance difference between two subframe images. In this case, the distribution unit 105 can generate, as the first subframe image, an image obtained by multiplying each pixel value of a low-frequency enhanced image by 0.8.

The difference detection unit 106 acquires the input frame image 101 from the frame memory 102. Further, the difference detection unit 106 acquires the first subframe image from the distribution unit 105. The difference detection unit 106 generates, as the second subframe image, an image (difference image) obtained by subtracting each pixel value of the first subframe image from that of the input frame image (subtraction unit). In this manner, the second subframe image, in which high-frequency components are enhanced, can be attained.

The switching circuit 107 outputs either the first or second subframe image as an output frame image to a subsequent processing circuit while switching the output at a desired frequency (output unit). In the first embodiment, the switching circuit 107 switches the output at a frequency twice the frame rate of an input moving image. For example, when a 60-Hz moving image is input, the switching circuit 107 switches the output at 120 Hz. This can increase the frame rate of the moving image. The switching circuit 107 may further include a buffer circuit. The buffer circuit can temporarily buffer the first and second input subframe images till the output timing.

FIG. 2A exemplifies processing in the first embodiment. In FIG. 2A, a waveform indicates image data in the analog form. For descriptive convenience, FIG. 2A shows image data of a single color. A waveform 201 is an example of an input waveform (input frame image). A waveform 202 is obtained when the minimum value filter 103 executes minimum value filtering for the waveform 201. In a boundary region where large and small pixel values are adjacent to each other, the small pixel value is selected. As a result, the boundary between large and small pixel values moves inside the region of the large pixel value, as represented by the waveform 202.

A waveform 203 indicates a result obtained by applying a low-pass filter to the waveform 202 by the low-pass filtering unit 104. A waveform 204 is the waveform of the first subframe image. The waveform 204 is obtained by multiplying the waveform 203 by 0.5 by the distribution unit 105. A waveform 205 is the waveform of the second subframe image obtained by the difference detection unit 106. A waveform obtained by alternately displaying the waveform 204 of the first subframe image and the waveform 205 of the second subframe image at high speed is visually identical to a waveform 206. That is, a waveform attained by alternate display is perceived as one identical to the waveform 201 of the input frame image 101.

This processing according to the first embodiment will be described with reference to the flowchart of FIG. 3A. In step S301, a user designation is acquired to make initial settings. In the first embodiment, the size of a filter used in the minimum value filter 103, the characteristic of a low-pass filter used in the low-pass filtering unit 104, and the brightness ratio of subframe images that is used in the distribution unit 105 are set. However, other settings regarding the image processing apparatus of the embodiment can also be made.

In step S302, the image processing apparatus according to the embodiment receives the frame image 101. In step S303, the frame memory 102 temporarily stores the frame image 101. In step S304, the minimum value filter 103 performs the above-mentioned minimum value filtering for the input frame image 101, generating a preprocessed image. In step S305, the low-pass filtering unit 104 applies a low-pass filter to the preprocessed image output from the minimum value filter 103, generating a low-frequency enhanced image.

In step S306, the distribution unit 105 generates the first subframe image in the foregoing way. More specifically, the first subframe image is obtained so that the distribution unit 105 multiplies each pixel value of the low-frequency enhanced image generated by the low-pass filtering unit 104 by a predetermined allotment ratio. The first subframe image may be generated by multiplying each pixel value of the low-frequency enhanced image by a predetermined allotment ratio to update the low-frequency enhanced image. The predetermined allotment ratio is 0.5 in the first embodiment, but may be another value, as described above. The predetermined allotment ratio is generally 0 (inclusive) to 1 (inclusive). By this processing, generation of the first subframe image in which low-frequency components are enhanced is completed. In step S307, the difference detection unit 106 generates, as the second subframe image, an image (difference image) by subtracting each pixel value of the first subframe image generated by the distribution unit 105 from each pixel value of the input frame image 101.

In step S308, the switching circuit 107 determines the output timing of the frame image. If the switching circuit 107 determines in step S308 that the output timing of the first subframe image has arrived ("YES" in step S308), the process shifts to step S309. In step S309, the switching circuit 107 outputs the first subframe image generated by the distribution unit 105. In step S310, the switching circuit 107 determines the output timing of the frame image. If the switching circuit 107 determines in step S310 that the output timing of the second frame image has arrived ("YES" in step S310), the process shifts to step S311. In step S311, the switching circuit 107 outputs the second subframe image generated by the difference detection unit 106.

The first and second subframe images may be temporarily held in a storage device such as a buffer circuit in the switching circuit 107, or a frame memory (not shown). In step S309 or S311, the switching circuit 107 may read out the first or second subframe image from the storage device and output it. The output timing may be determined in step S308 or S310 in accordance with, for example, a control signal from a control circuit (not shown). Alternatively, the output timing may be determined in accordance with a control signal from the timer of the switching circuit 107.

If all frame images have been processed ("YES" in step S312), the process ends. If an unprocessed frame image remains ("NO" in step S312), the process returns to step S302 and is repeated. The determination in step S312 may be made in accordance with, for example, a control signal from a control circuit (not shown) which controls input of a frame image.

The output order of subframe images that has been described with reference to the flowchart of FIG. 3A is merely an example and is not limited to this. For example, the first subframe image may be output after outputting the second subframe image. In the first embodiment, the output timing is determined after creating two subframe images, but the embodiment of the present invention is not limited to this. For example, upon completion of low-pass filtering in step S306, the switching circuit 107 may determine the output timing of the first subframe image. After outputting the first subframe image, the difference detection unit 106 may generate the second subframe image. It is also possible to appropriately set the allotment ratio used in the distribution unit 105 and output at least either the first or second subframe image a plurality of number of times, raising a frame rate more than three times higher.

According to the first embodiment described above, the impulse-type display device displays the first subframe image instantaneously in the first $1/120$ sec, and displays the second subframe image instantaneously in the next $1/120$ sec. When subframe images were actually generated from an input frame image and displayed at a raised frame rate according to the first embodiment, an image blur could be suppressed.

Second Embodiment

Figure 1B:
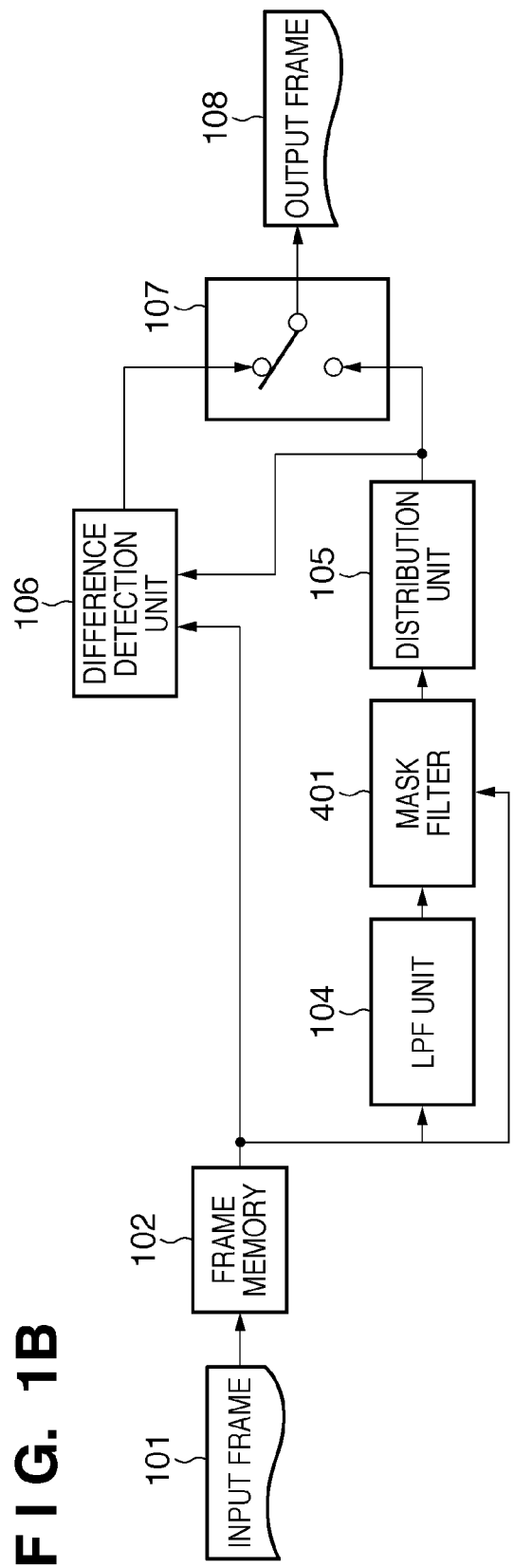

The second embodiment employs a mask filter 401 instead of the minimum value filter 103 in order to suppress a blur when the frame rate is raised. The second embodiment will be explained using the block diagram of FIG. 1B and the processing waveform example of FIG. 2B. In FIG. 1B, the same reference numerals as those in FIG. 1A denote processing blocks having the same functions as those of the processing blocks included in the image processing apparatus in FIG. 1A. In the second embodiment, when processing a color image, the following processing can be performed for each image with respective color components. For example, for an image having R, G, and B components, the following processing can be executed for an R component image, G component image, and B component image. This also applies to an image with Y, Cb, and Cr components. The following processing may be done for, for example, only the R component out of several color components. It is also possible to calculate a Y component from R, G, and B components, perform the following processing for the Y component, and apply the processing result to the R, G, and B components.

Similar to the first embodiment, an input frame image 101 serving as an input image is divided into two to generate the first and second subframe images. In the second embodiment, a low-pass filtering unit 104 generates a low-frequency enhanced image by applying a low-pass filter to the input frame image 101 acquired from a frame memory 102. Details of low-pass filtering are the same as those in the first embodiment, and a description thereof will not be repeated.

The mask filter 401 generates a masked image from the input frame image 101 and the low-frequency enhanced image generated by the low-pass filtering unit 104 (composition unit). More specifically, the mask filter 401 generates a masked image by comparing the pixel value of the input frame image 101 with that of the low-frequency enhanced image at each pixel position, and setting a smaller pixel value as a pixel value at the pixel position in the masked image.

The mask filter 401 will be explained in detail. FIG. 11 shows a practical circuit arrangement of the mask filter 401. A comparator 2603 compares the pixel value of a low-frequency enhanced image 2602 generated by the low-pass filtering unit 104, and that of the input frame image 101 for each pixel, and outputs the comparison result to a selector 2604. The selector 2604 selects the pixel value of the input frame image 101 when the pixel value of the input frame image 101 is smaller, and that of the low-frequency enhanced image 2602 when the pixel value of the low-frequency enhanced image 2602 is smaller. The selector 2604 generates a masked image 2605 by setting the selected pixel value as a pixel value in the masked image 2605. A distribution unit 105, difference detection unit 106, and switching circuit 107 operate similarly to those in the first embodiment.

Figure 2B:
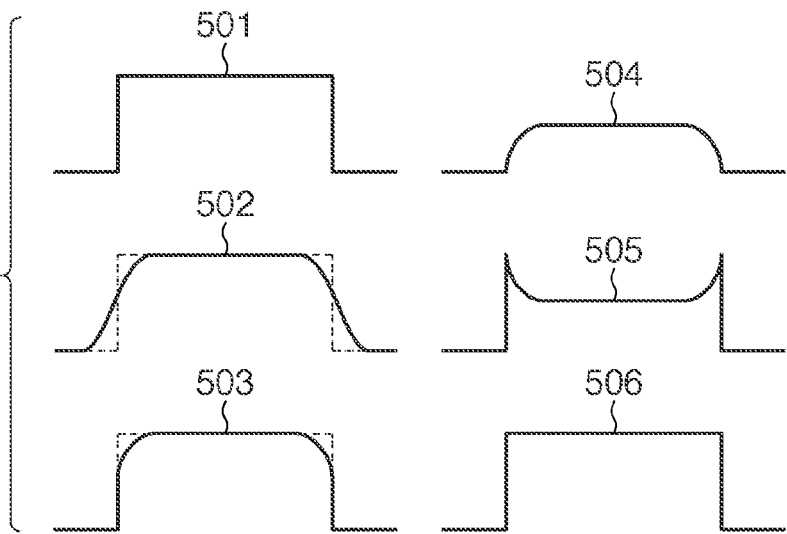

The effect of the second embodiment will be explained with reference to FIG. 2B showing image data by a waveform in the analog form, similar to FIG. 2A. In the example of FIG. 2B, a waveform 501 is input as the input frame image 101. The low-pass filtering unit 104 applies a low-pass filter to the waveform 501, generating a waveform 502 representing a low-frequency enhanced image. The mask filter 401 compares each pixel value of the waveform 501 representing the input frame image 101 and that of the waveform 502 representing the low-frequency enhanced image. The mask filter selects a smaller one of the pixel values of the waveforms 501 and 502, generating a waveform 503 representing a masked image. Similar to the first embodiment, the distribution unit 105 generates a waveform 504 representing the first subframe image from the waveform 503. The difference detection unit 106 generates a waveform 505 representing the second subframe image from the waveforms 501 and 504. When the waveforms 504 and 505 are sequentially displayed at high speed, the viewer perceives this display like one represented by a waveform 506. The waveform 506 is identical to the waveform 501.

An advantage of performing image processing of the second embodiment will be described. Assume that an image 2701 in FIG. 12 in which R and B single colors are arranged side by side is input. A waveform 2700 is the waveform of an R pixel value in the image 2701. When the first subframe image is generated from this input image using only the above-mentioned low-pass filtering, the R pixel value of the first subframe image becomes one as indicated by a waveform 2703. The second subframe image is the difference between the waveforms 2700 and 2703, so the R pixel value of the second subframe image becomes one indicated by a waveform 2704. Since no negative pixel value can be displayed, the waveform of the second subframe image to be displayed becomes a waveform 2705. The viewer perceives high-speed alternate display of the first and second subframe images like one represented by a waveform 2706. The comparison between the waveforms 2700 and 2706 reveals that a pixel having a larger pixel value, compared to the waveform 2700, appears at the boundary between R and B. This causes a color blur at the boundary between R and B, like an image 2702.

To the contrary, when the mask filter 401, which is a feature of the second embodiment, is used, the first subframe image become one represented by a waveform 2707, as described above with reference to FIG. 2B. Thus, the second subframe image becomes one represented by a waveform 2708. Alternate display of the waveforms 2707 and 2708 results in a waveform 2709, and a color blur as represented by the waveform 2706 does not occur. According to the second embodiment, generation of a color blur is suppressed using the mask filter 401.

Processing according to the second embodiment will be described with reference to the flowchart of FIG. 3B. In FIG. 3B, the same reference numerals as those in FIG. 3A denote the same processes as those in the flowchart of FIG. 3A according to the first embodiment. In the following description, a detailed description of the same processes as those in the first embodiment will not be repeated.

In step S301, necessary initial settings are made. In step S302, a frame image is input as the input frame image 101. In step S303, the frame memory 102 temporarily stores the input frame image 101. These processes are the same as those in the first embodiment. In step S305, the low-pass filtering unit 104 applies a low-pass filter to the input frame image 101.

In step S601, the mask filter 401 generates a masked image in the above-described fashion using a low-frequency enhanced image generated by the low-pass filtering unit 104 and the input frame image 101. In step S306, the distribution unit 105 generates the first subframe image using the masked image generated by the mask filter 401. Subsequent processes in steps S307 to S312 are the same as those in the first embodiment, and a description thereof will not be repeated. When subframe images were actually generated from an input frame image and displayed at a raised frame rate according to the second embodiment, an image blur could be suppressed.

As preprocessing before low-pass filtering, minimum value filtering may be done. In minimum value filtering, a minimum value in pixel values around the pixel of interest is set as the pixel value of the pixel of interest after filtering. Although this minimum value filtering is similar to that in the first embodiment, the pixel values of respective colors need not be equalized, unlike the first embodiment. More specifically, in minimum value filtering, image data of (M×N) pixels around the pixel of interest are referred to. Then, a minimum value in pixel values, that is, a minimum value in R pixel values is obtained from the referred pixels (in the case of R, G, and B data). The obtained minimum value is set as the R pixel value of the pixel of interest after filtering. This also applies to G and B pixel values. Needless to say, an image with other color data such as Y, Cb, and Cr data is similarly processed. Also, minimum value filtering may be done not for all colors but for only some colors.

FIG. 13A shows a moving image characteristic after processing when no minimum value filter is used in the second embodiment. A smooth portion generated by applying the low-pass filter is shaved by mask filtering, generating a motion blur. FIG. 13B shows a moving image characteristic when the minimum value filter is used in the second embodiment. The use of the minimum value filter suppresses a motion blur without shaving a smooth portion generated by applying the low-pass filter, unlike FIG. 13A. In the second embodiment, a better result can be attained by applying the minimum value filter. In the second embodiment, a high-frequency component containing subframe image generated from an input frame image and low-frequency component containing subframe image does not take a negative pixel value. Similar to the first embodiment, the second embodiment suppresses generation of a color blur although the second embodiment is different from the first embodiment in the subframe image generation method.

Modification 1

A modification to the first and second embodiments will be explained with reference to FIGS. 7A and 7B. The first and second embodiments have described a method of raising the frame rate of a moving image to be displayed on an impulse-type display device. This modification will explain a method of raising the frame rate of a moving image to be displayed on a hold-type display device.

For example, a case in which the frame rate of a 60-Hz moving image is raised to 120 Hz will be examined. Assume that the frame image has brightness A. When the impulse-type display device displays the first subframe image with brightness A and displays the second subframe image with brightness A in $\frac{1}{60}$ sec, the viewer perceives the brightness of the frame image as 2A. For this reason, the brightness is adjusted using the distribution unit 105 in the first embodiment. In contrast, when the hold-type display device displays the first subframe image with brightness A in the first $\frac{1}{120}$ sec and the second subframe image with brightness A in the next $\frac{1}{120}$ sec, the viewer perceives the brightness of the frame image as A. In this manner, the impulse-type display device and the hold-type display device have different characteristics. With the arrangement in the modification, the frame rate of a moving image to be displayed on the hold-type display device can be increased.

FIG. 7A exemplifies the arrangement of an image processing apparatus according to a modification to the first embodiment. The operations of the frame memory 102, the minimum value filter 103, and the low-pass filtering unit 104 are the same as those in the first embodiment. A low-frequency enhanced image generated by the low-pass filtering unit 104 is directly output as the first subframe image to the difference detection unit 106 and the switching circuit 107.

The difference detection unit 106 generates a difference image by subtracting each pixel value of the first subframe image generated by the low-pass filtering unit 104 from each pixel value of the input frame image 101. An adder 701 generates the second subframe image by adding each pixel value of a difference image generated by the difference detection unit 106 and each pixel value of the input frame image 101. The operation of the switching circuit 107 is the same as that in the first embodiment.

FIG. 9A is a flowchart showing processing according to the modification to the first embodiment. In FIGS. 9A and 9B, the same reference numerals as those in FIGS. 3A and 3B denote the same processes as those in the flowcharts of FIGS. 3A and 3B. Processes in steps S301 to S305 are the same as those in the first embodiment, and a description thereof will not be repeated. In step S901, the difference detection unit 106 generates a difference image from the input frame image 101 and a low-frequency enhanced image generated by the low-pass filtering unit 104. In step S902, the adder 701 generates the second subframe image from the input frame image 101 and the difference image generated by the difference detection unit 106, as described above. Processes in steps S308 to S312 are the same as those in the first embodiment, and a description thereof will not be repeated.

FIG. 7B exemplifies the arrangement of an image processing apparatus according to a modification to the second embodiment. In this modification, the operations of the frame memory 102, the low-pass filtering unit 104, and the mask filter 401 are the same as those in the second embodiment. A masked image generated by the mask filter 401 is directly output as the first subframe image to the difference detection unit 106 and the switching circuit 107. The operations of the difference detection unit 106, adder 701, and switching circuit 107 are the same as those in the modification to the first embodiment.

FIG. 9B is a flowchart showing processing according to the modification to the second embodiment. Processes in steps S301 to S305, S601, and S308 to S312 are the same as those in the first embodiment, and a description thereof will not be repeated. In step S901, the difference detection unit 106 generates a difference image in the foregoing way from the input frame image 101 and a masked image generated by the mask filter 401. In step S902, the adder 701 generates the second subframe image from the input frame image 101 and the difference image generated by the difference detection unit 106, as described above.

In this modification, a high-frequency component containing a subframe image generated from an input frame image and a low-frequency component containing a subframe image does not take a negative pixel value. Similar to the first and second embodiments, the modification suppresses generation of a color blur, although the modification is different from the first and second embodiments in the subframe image generation method.

Note that a display device which displays a subframe image for a time shorter than $\frac{1}{120}$ sec can also be implemented by, for example, improving the liquid-crystal response characteristic, or controlling the backlight. An image processing apparatus according to the modification can generate even an image to be displayed on this display device. Also in this case, subframe images that look the same as an input frame image when they are displayed successively are generated, which is a feature of the present invention.

A moving image to be displayed on the hold-type display device can also be generated by the following method. More specifically, the first and second subframe images are generated according to the first or second embodiment. Then, the switching circuit 107 multiplies the pixel values of the respective subframe images by appropriate values, outputting them as an output frame image. For example, in the first embodiment, the distribution unit 105 performs processing at an allotment ratio of 0.5. The switching circuit 107 multiplies the pixel values of the first and second subframe images by 2. According to this method, the same result as that of modification 1 can be obtained by the method of the first embodiment. As a matter of course, this multiplication need not be executed by the switching circuit 107, and may be performed by another proper processing unit or output device.

Modification 2

Figure 2C:
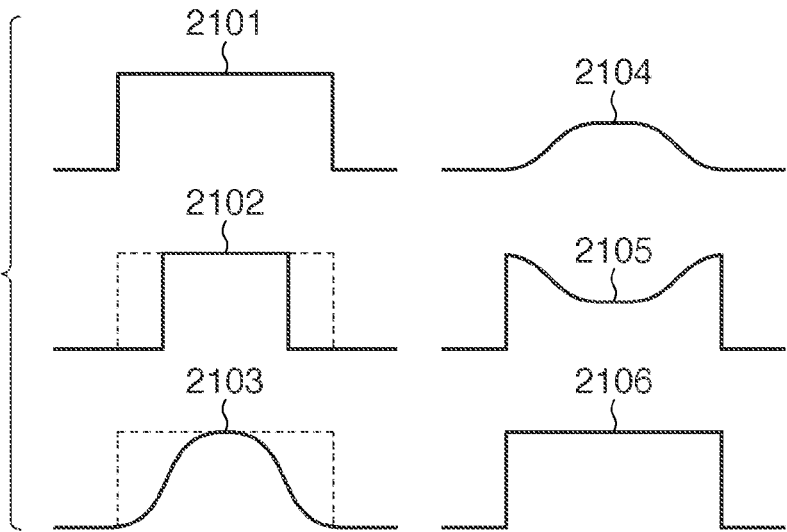
Figure 4:
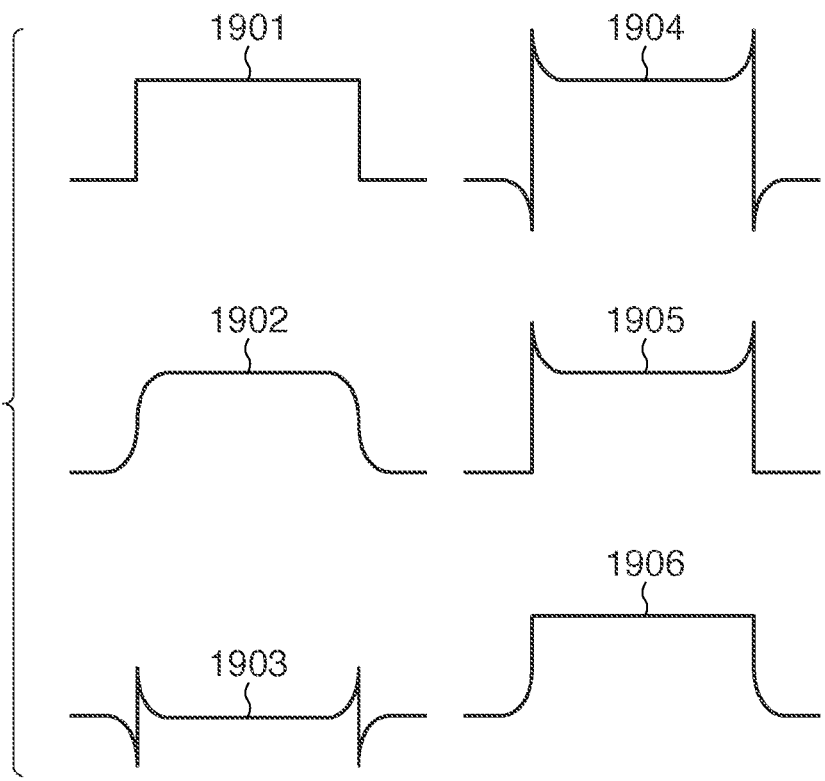
FIG. 4 is a waveform chart for explaining processing according to a conventional method.

A modification to the first embodiment will be explained with reference to FIG. 2C and FIG. 6. When a low-pass filter with a wide range of influence is used, the range of application of the minimum value filter also needs to be widened. For example, a waveform 2103 in FIG. 2C is obtained by applying, to a waveform 2102, a low-pass filter which changes the waveform in a range wider than that of the low-pass filter used in FIG. 2A. Also in this case, a portion of the waveform 2102 at which the pixel value is large can be made narrower than the waveform 202 in FIG. 2A so as not to generate a negative value in a second subframe image 2105. That is, a minimum value filter larger in application range than that in FIG. 2A (waveform 202) is desirably used to waveform 2101 in order to obtain the waveform 2102. Setting the range of influence of the minimum value filter to be equal to or wider than that of influence of the low-pass filter can prevent generation of a negative pixel value when generating the second subframe image.

The relationship between the low-pass filter and the minimum value filter will be explained with reference to 6A-6D of FIG. 6. In FIG. 6, an area affected by the filter will be explained referring to the tap length. When filtering is done for each pixel, the tap length corresponds to the filter size, that is, M and N pixels in FIG. 8. A filter characteristic graph 2201 shows a low-pass filter characteristic used to generate the waveform 203 in FIG. 2A. A waveform indicated by a dotted line is an input waveform, and one indicated by a solid line is a waveform obtained by performing filtering for the input waveform. Reference numerals 2202 and 2205 each denote a pixel sample point. In this case, the filter has an influence in an area with five horizontal pixels. In other words, the horizontal tap length of the low-pass filter is 5. Assume that the low-pass filter is symmetrical. Then, by setting the tap length of the minimum value filter to 5, an area affected by the low-pass filter can be prevented from extending outside a portion of the input waveform at which the pixel value is large, as represented by 2203.

Similarly, a case in which the tap length of the low-pass filter is 9, that is, the low-pass filter has a filter characteristic 2204 will be examined. In this case, by setting the tap length of the minimum value filter to 9 or more, an area where a pixel value is affected by the low-pass filter is prevented from extending outside a portion of the input waveform at which the pixel value is large, as represented by 2206.

In this fashion, the tap length of the minimum value filter is set to be at least equal to or larger than that of the low-pass filter. This can prevent generation of a negative pixel value when the pixel value of an image having undergone low-pass filtering is subtracted from that of an input frame image. To simplify the description, the number of horizontal taps (tap length) has been described. However, when filtering is done even in the vertical direction, the number of taps of the minimum value filter can be determined based on both the numbers of horizontal and vertical taps of the low-pass filter.

In actual minimum value filtering and low-pass filtering, the number of taps may be set even in the vertical direction. As shown in FIG. 8, the number of vertical taps in low-pass filtering is set to a natural number N, and the number of horizontal taps is set to a natural number M. N and M may take the same value or different values. For example, (N, M)=(5, 5), (7, 5), or (5, 7) may be set.

The number of vertical taps of the minimum value filter is set to a natural number N', and the number of horizontal taps is set to a natural number M'. In this case, pixels affected by the minimum value filter are pixels in a region that is centered on the pixel of interest and has N' pixels in the vertical direction and M' pixels in the horizontal direction. In minimum value filtering, a minimum pixel value in pixels in this region is determined as a minimum value. In the embodiment, it suffices that N' is equal to or larger than N, and M' is equal to or larger than M. The discussion about the number of taps also applies to the relationship between the minimum value filter and the low-pass filter in the second embodiment.

Third Embodiment

Figure 5:
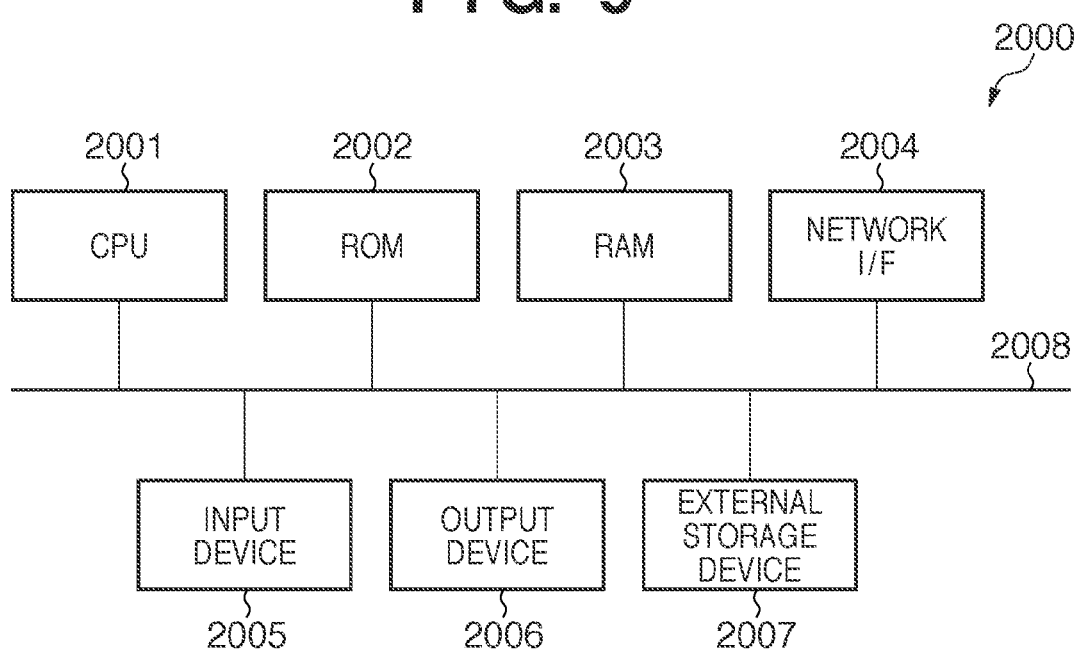
FIG. 5 is a block diagram exemplifying the hardware arrangement of an image processing apparatus according to the third embodiment.

FIG. 5 is a block diagram exemplifying the hardware arrangement of a computer serving as an image processing apparatus for implementing the first and second embodiments of the present invention and the modifications to them. However, the image processing apparatus according to the third embodiment need not include all units shown in FIG. 5.

In FIG. 5, a CPU 2001 controls the operation of an image processing apparatus 2000 by executing an OS, application program, and the like stored in an external storage device (hard disk) 2007. By executing a corresponding processing program, the CPU 2001 functions as each unit described in the first and second embodiments, and achieves, for example, processing shown in FIG. 3A or 3B. More specifically, the CPU 2001 functions as units including a minimum value filter 103 and low-pass filtering unit 104 in FIG. 1A, a mask filter 401 in FIG. 1B, a difference detection unit 106, and a distribution unit 105. The CPU 2001 temporarily stores, in a RAM 2003, information, files, and the like necessary to execute a program. By controlling the RAM 2003, the CPU 2001 can implement a switching circuit 107 in FIG. 1A.

A ROM 2002 stores programs such as a basic I/O program. The RAM 2003 functions as a main memory, work area, and the like for the CPU 2001. A network interface (I/F) 2004 connects the computer of the third embodiment to a LAN or WAN and allows it to communicate with an external apparatus.

An input device 2005 can include at least either of a mouse and keyboard for accepting an input from the user, and an image sensing device for sensing an object image and inputting the image to the image processing apparatus 2000. With the image sensing device, the image processing apparatus 2000 can function as a digital camera or digital video camera.

An output device 2006 includes a hold-type display device such as a liquid crystal display, and an impulse-type display device such as a field-emission-type display device. The external storage device 2007 stores programs including an application program, a driver program, an OS, a control program, and a processing program for executing processing according to the embodiment. A system bus 2008 connects the units in the image processing apparatus 2000 to allow data exchange.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-249478, filed Oct. 29, 2009, which is hereby incorporated by reference herein in its entirety.

What is claimed is:

1. An image processing apparatus comprising a processor for executing a method comprising:
    an acquisition step of acquiring a frame image;
    an identification step of identifying a single minimum pixel value, wherein the single minimum pixel value is a minimum value of a first minimum pixel value, a second minimum pixel value, and a third minimum pixel value, the first minimum pixel value being a minimum value of pixel values of a first color component of all pixels within a predetermined area including a pixel of interest in the frame image, the second minimum pixel value being a minimum value of pixel values of a second color component of all pixels within the predetermined area including the pixel of interest in the frame image, and the third minimum pixel value being a minimum value of pixel values of a third color component of all pixels within the predetermined area including the pixel of interest in the frame image;

a replacing step of replacing pixel values of the first, second, and third color components of the pixel of interest in the frame image with the single minimum pixel value identified in said identification step such that respective first, second, and third pixel values of the first, second, and third color components of the pixel of interest are equal;

a low-pass filtering step of applying a low-pass filter processing to a preprocessed image, wherein the preprocessed image is generated based on replacing the pixel values in the replacing step; and an output step of outputting a first subframe image based on a result of the low-pass filter processing for the preprocessed image and of outputting a second subframe image based on a difference between the frame image acquired in the acquisition step and the first subframe, wherein the first and second subframes are output alternately in the output step.

2. The apparatus according to claim 1, wherein the processor is further configured for executing a step of multiplying, by a predetermined ratio, pixel values of an image obtained by applying the low-pass filter processing, wherein the first subframe having a pixel value based on a result of multiplying by the predetermined ratio is output in the output step.

3. The apparatus according to claim 1, wherein N' is not smaller than N, and M' is not smaller than M, wherein N is a number of vertical taps for the low-pass filter processing in said low-pass filtering step, M is a number of horizontal taps for the low-pass filter processing in said low-pass filtering step, N' is a number of pixels in a vertical direction corresponding to the predetermined area, and M' is a number of pixels in a horizontal direction corresponding to the predetermined area.

4. An image processing apparatus comprising a processor for executing a method comprising:

an acquisition step of acquiring a frame image having a plurality of pixels;

a low-pass filtering step of generating a low-frequency enhanced image by applying a low-pass filter to the frame image acquired in the acquisition step;

a generating step of generating a first subframe image based on both the frame image acquired in the acquisition step and the low-frequency enhanced image generated in the low-pass filtering step, wherein each pixel of the first subframe image has a smaller pixel value of (a) a pixel value of a corresponding position in the frame image acquired in the acquisition step and (b) a pixel value of a corresponding position in the low-frequency enhanced image; and an output step of outputting an image based on the first subframe image and of outputting an image based on a second subframe image, the second subframe image being a difference image between the first subframe image and the frame image acquired in the acquisition step, wherein the image based on the first subframe image and the image based on the second subframe image are output alternately in the output step.

5. The apparatus according to claim 4, wherein the processor is further configured for executing steps comprising:

an identification step of identifying a single minimum pixel value, wherein the single minimum pixel value is a minimum value of a first minimum pixel value, a second minimum pixel value, and a third minimum pixel value, the first minimum pixel value being a minimum value of pixel values of a first color component of all pixels within a predetermined area including a pixel of interest in the frame image, the second minimum pixel value being a minimum value of pixel values of a second color component of all pixels within the predetermined area including the pixel of interest in the frame image, and the third minimum pixel value being a minimum value of pixel values of a third color component of all pixels within the predetermined area including the pixel of interest in the frame image; and a replacing step of replacing pixel values of the first, second and third color components of the pixel of interest in the frame image with the single minimum pixel value identified in said identification step, such that respective first, second, and third pixel values of the first, second, and third color components of the pixel of interest are equal;

wherein the low-frequency enhanced image is generated by applying the low-pass filter to the frame image resulted from the replacing step, in the low-pass filtering step.

6. The apparatus according to claim 5, wherein N' is not smaller than N, and M' is not smaller than M, wherein N is a number of vertical taps for the low-pass filter processing in said low-pass filtering step, M is a number of horizontal taps for the low-pass filter processing in said low-pass filtering step, N' is a number of pixels in a vertical direction corresponding to the predetermined area, and M' is a number of pixels in a horizontal direction corresponding to the predetermined area.

7. The apparatus according to claim 4, wherein the processor is further configured for executing a step of multiplying the smaller pixel value by a predetermined ratio, wherein the first subframe image having a pixel value based on a result of multiplying by the predetermined ratio is output in the output step.

8. An image processing method executed by an image processing apparatus, the method comprising:

an acquisition step of acquiring a frame image;

an identification step of identifying a single minimum pixel value, wherein the single minimum pixel value is a minimum value of a first minimum pixel value, a second minimum pixel value, and a third minimum pixel value, the first minimum pixel value being a minimum value of pixel values of a first color component of all pixels within a predetermined area including a pixel of interest in the frame image, the second minimum pixel value being a minimum value of pixel values of a second color component of all pixels within the predetermined area including the pixel of interest in the frame image, and the third minimum pixel value being a minimum value of pixel values of a third color component of all pixels within the predetermined area including the pixel of interest in the frame image;

a replacing step of replacing pixel values of the first, second, and third color components of the pixel of interest in the frame image with the single minimum pixel value identified in the identification step such that respective first, second, and third pixel values of the first, second, and third color components of the pixel of interest are equal;

a low-pass filtering step of applying a low-pass filter processing to a preprocessed image, wherein the preprocessed image is generated based on replacing the pixel value in the replacing step; and an output step of outputting a first subframe image based on a result of the low-pass filter processing for the preprocessed image and of outputting a second subframe image based on a difference between the frame image acquired in the acquisition step and the first subframe, wherein the first and second subframes are output alternately in the output step.

9. An image processing method executed by an image processing apparatus, the method comprising:
an acquisition step of acquiring a frame image having a plurality of pixels;
a low-pass filtering step of generating a low-frequency enhanced image by applying a low-pass filter to the frame image acquired in the acquisition step;
a generation step of generating a first subframe image based on both the frame image acquired in the acquisition step and the low-frequency enhanced image generated in the low-pass filtering step, wherein each pixel of the first subframe image has a smaller pixel value of (a) a pixel value of a corresponding position in the frame image acquired in the acquisition step and (b) a pixel value of a corresponding position in the low-frequency enhanced image; and
an output step of outputting an image based on the first subframe image and of outputting an image based on a second subframe image, the second subframe image being a difference image between the first subframe image and the frame image acquired in the acquisition step, wherein the image based on the first subframe image and the image based on the second subframe image are output alternately in the output step.

10. A non-transitory computer-readable medium storing a program for causing a computer to execute a method comprising:
an acquisition step of acquiring a frame image;
an identification step of identifying a single minimum pixel value, wherein the single minimum pixel value is a minimum value of a first minimum pixel value, a second minimum pixel value, and a third minimum pixel value, the first minimum pixel value being a minimum value of pixel values of a first color component of all pixels within a predetermined area including a pixel of interest in the frame image, the second minimum pixel value being a minimum value of pixel values of a second color component of all pixels within the predetermined area including the pixel of interest in the frame image, and the third minimum pixel value being a minimum value of pixel values of a third color component of all pixels within the predetermined area including the pixel of interest in the frame image;
a replacing step of replacing pixel values of the first, second, and third color components of the pixel of interest in the frame image with the single minimum pixel value identified in the identification step such that respective first, second, and third pixel values of the first, second, and third color components of the pixel of interest are equal;
a low-pass filtering step of applying a low-pass filter processing to a preprocessed image, wherein the preprocessed image is generated based on replacing the pixel values in the replacing step; and
an output step of outputting a first subframe image based on a result of the low-pass filter processing for the preprocessed image and outputting a second subframe image based on a difference between the frame image acquired in the acquisition step and the first subframe, wherein the first and second subframes are output alternately in the output step.

11. A non-transitory computer-readable medium storing a program for causing a computer to execute a method comprising:
an acquisition step of acquiring a frame image having a plurality of pixels;
a low-pass filtering step of generating a low-frequency enhanced image by applying a low-pass filter to the frame image acquired in the acquisition step;
a generation step of generating a first subframe image based on both the frame image acquired in the acquisition step and the low-frequency enhanced image generated in the low-pass filtering step, wherein each pixel of the first subframe image has a smaller pixel value of (a) a pixel value of a corresponding position in the frame image acquired in the acquisition step and (b) a pixel value of a corresponding position in the low-frequency enhanced image; and
an output step of outputting an image based on the first subframe image and outputting an image based on a second subframe image, the second subframe image being a difference image between the first subframe image and the frame image acquired in the acquisition step, wherein the image based on the first subframe image and the image based on the second subframe image are output alternately in the output step.

* * * * *